United States Patent [19]

Dula et al.

[11] 3,811,710

[45] May 21, 1974

[54] SEALED TUBULAR JOINT

[75] Inventors: Alfred A. Dula; Elwood Wehring, both of Houston, Tex.

[73] Assignee: Pipe Specialties, Inc., Houston, Tex.

[22] Filed: Oct. 22, 1971

[21] Appl. No.: 191,644

Related U.S. Application Data

[63] Continuation-in-part of Ser. No. 876,307, Nov. 13, 1969, abandoned.

[52] U.S. Cl............... 285/55, 285/93, 285/355, 285/369, 277/206
[51] Int. Cl. .............................................. F16l 9/14
[58] Field of Search....... 285/55, 93, 355, 364, 417, 285/374, 399; 277/206, 191, 190

[56]  References Cited
UNITED STATES PATENTS

| | | | |
|---|---|---|---|
| 2,676,040 | 4/1954 | Dalton | 277/187 |
| 2,892,991 | 6/1959 | Beebee et al. | 285/93 X |
| 3,266,821 | 8/1966 | Safford | 285/55 X |
| 3,307,860 | 3/1967 | Blount et al. | 285/55 |

*Primary Examiner*—Jordan Franklin
*Assistant Examiner*—Wayne L. Shedd

[57]  ABSTRACT

A sealed joint for threaded tubular members including a male threaded member, a female threaded member having an internal groove interrupting its internal threads and a sealing ring in the groove and having an internal taper to seal against the external end taper of the male member. The internal groove in said female member having a tapered surface of increasing diameter in a direction away from the nearest end of the female member. The sealed joint is also suitable for use with internally coated tubular members, and the coating extends only partially through the groove in the female member. This abstract is neither intended to define the invention of the application which, of course, is measured by the claims, nor is it intended to be limiting as to the scope of the invention in any way.

6 Claims, 5 Drawing Figures

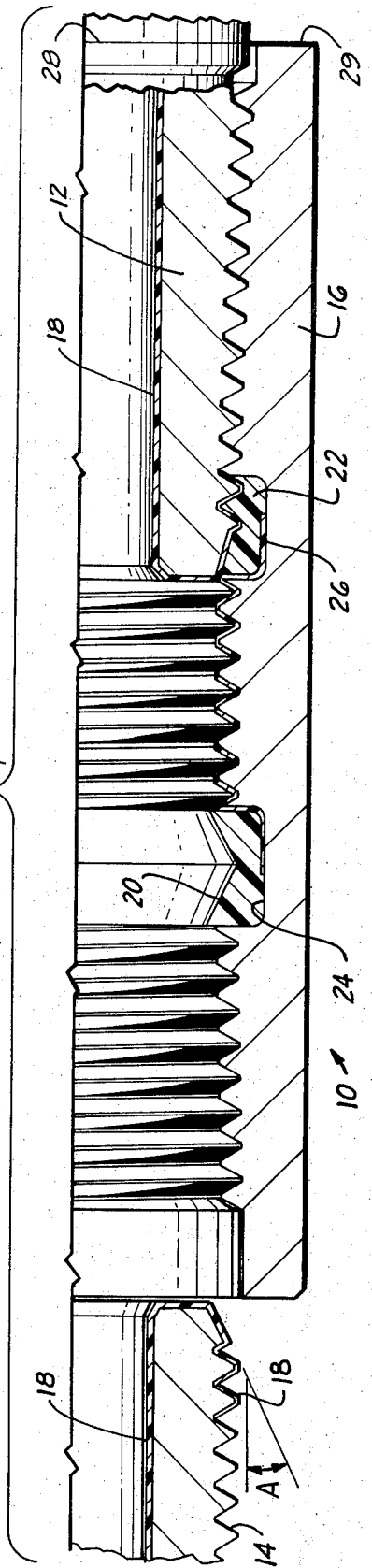
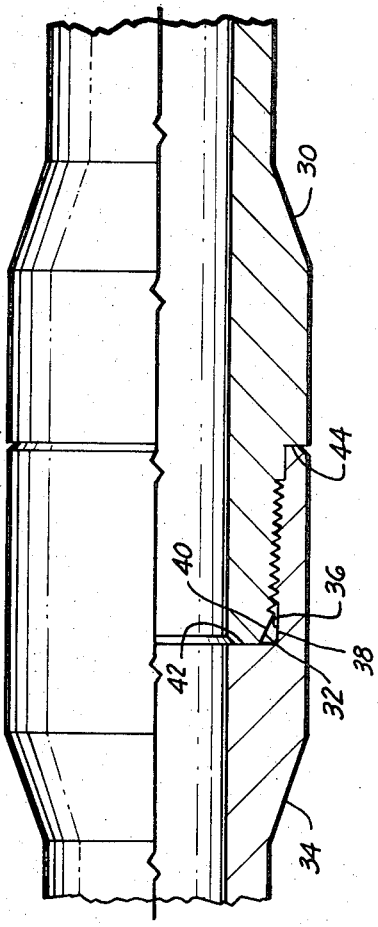
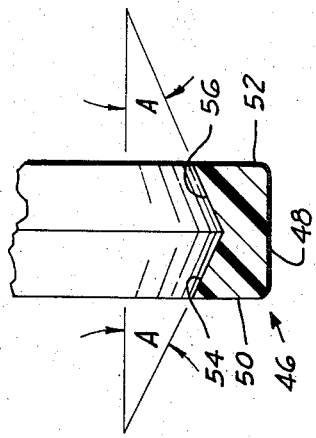
ALFRED A. DULA
ELWOOD WEHRING
    INVENTORS

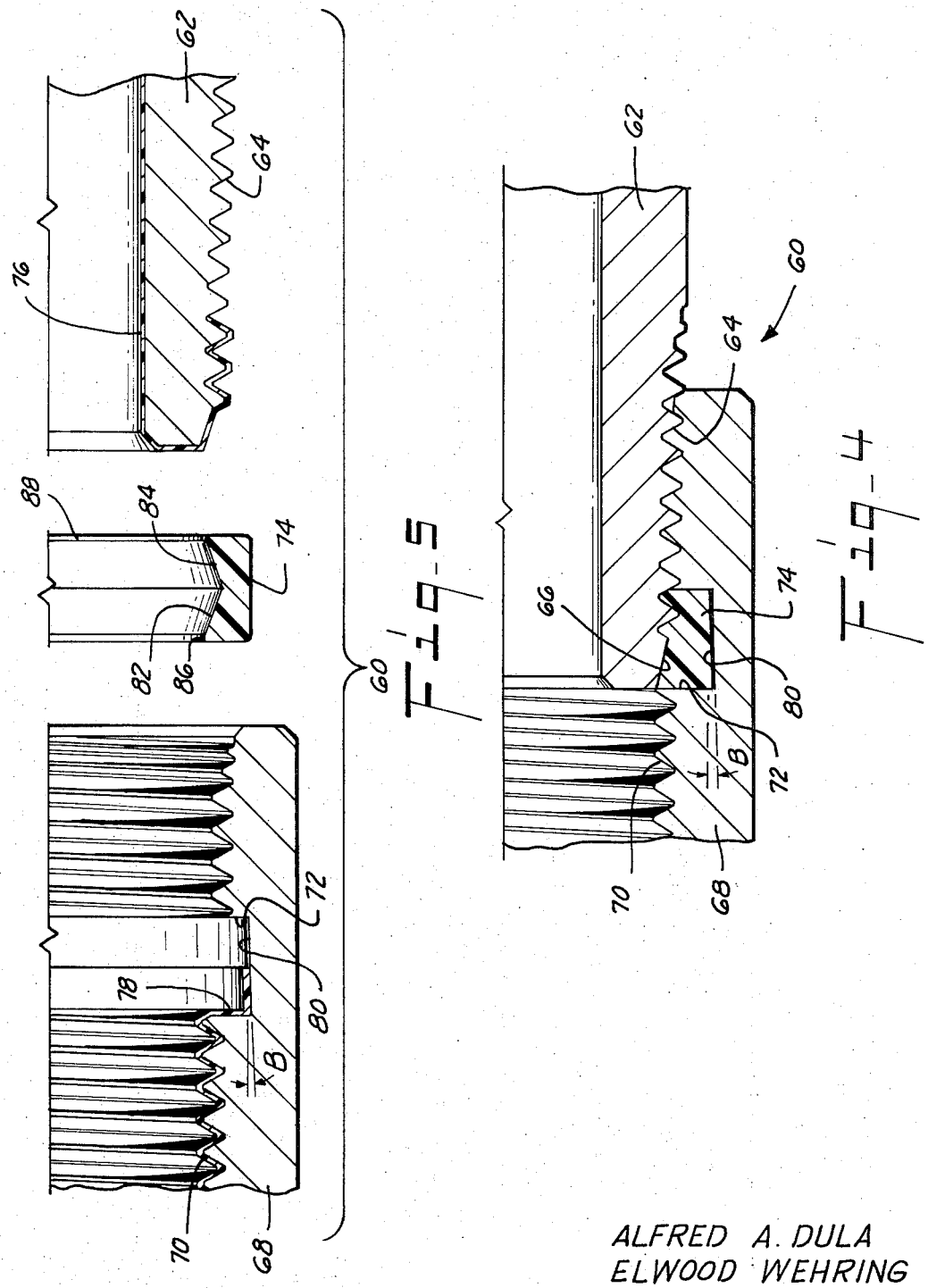

SEALED TUBULAR JOINT

REFERENCE TO RELATED APPLICATIONS

This application is a continuation-in-part of our prior copending application Ser. No. 876,307, filed Nov. 13, 1969, and now abandoned.

BACKGROUND OF THE INVENTION

In threaded pipe joints which have tapered threads, the sealing is generally accomplished by tightening the joint. In some cases one of the members is provided with a sealing ring which is to be engaged and forced into sealing engagement with the threads of the other member. The tightening of the two members must be continued until sufficient distortion of the sealing ring causes it to seal against the threads. Excess tightening of such joints can destroy the sealing ring. Internal coating on pipe creates difficulty in sealing threaded joints since the additional thickness of the coating on the threads of both members may prevent sufficient make-up of the members for sealing. In some cases it has been the practice to reduce the coating thickness on the threads to allow the needed make-up for sealing. This reduced thickness of coating may subject the threaded portions of the members to corrosion if the coating does not provide the needed protection.

SUMMARY

The present invention relates to an improved sealed joint for threaded tubular members.

An object of the present invention is to provide an improved threaded joint for tubular members which seals against leakage through the threads without excessive make-up.

A further object of the present invention is to provide an improved sealed joint for threaded pipe which does not require excess tightening of the pipe members to complete the seal.

Still another object is to provide an improved sealed threaded pipe joint suitable for use with internally coated pipe.

A still further object is to provide an improved sealed joint for tubular members in which the seal ring is protected from extrusion into the flow passage through the tubular members.

These and other objects and advantages of the present invention are hereinafter described and explained in reference to the structures shown in the drawing wherein:

FIG. 1 is a partial section view of a coupling joint with one of the pipe ends in sealed engagement and the other end withdrawn to illustrate the relaxed seal ring shape and the sealing position of the male end and the seal ring.

FIG. 2 is an elevation view part in a section of a pin and box threaded connection.

FIG. 3 is a partial sectional view of the improved seal ring of the present invention.

FIG. 4 is a partial sectional view of a coupling joint similar to FIG. 1.

FIG. 5 is an exploded view of portions of the components of the sealed joint shown in FIG. 4 to illustrate the taper of the groove.

DESCRIPTION OF THE PREFERRED EMBODIMENTS

The improved sealed joint of the present invention may be used with threaded pipe and pipe coupling joints, and with pin and box joints and may be used with internally coated pipe and pipe without coating. The joint shown in FIG. 1 is a pipe coupling joint 10 with one male pipe member 12 in sealed position and with the second male pipe member 14 in position to be threaded into the coupling 16. The pipes 12 and 14 have internal coatings 18 which extend around the ends of the male members and onto the first few external threads thereof. The coating may be of any suitable material and normally would be a material protecting the interior of the pipes from corrosion.

The improved joint of FIG. 1 includes the two threaded male members 12 and 14, the threaded female coupling 16 and the seal rings 20 and 22. The seal rings may be of any suitable material which will provide the sealing desired. Generally, polytetrafluoroethylene to be used for the sealing ring is preferred. The grooves 24 and 26 are formed in the coupling 16 interrupting the threads therein. These grooves provide a support for the seal rings which extend inwardly of the apex of the female threads.

The threads between the grooves 24 and 26 are coated with the same material which is applied to the pipes 12 and 14 and such coating extends into and covers at least a portion of such grooves. The coating thickness on the interior of the female member of the present invention may be the full thickness provided within the interior of the male members since there is no threaded engagement inside of the seal rings as can be seen from the drawings. As mentioned above a portion of the grooves may be coated and such coating provides a base to keep the seal rings from slipping in their grooves. Such coatings may be of any material such as a phenolic or an epoxy. With such coatings the usual thickness is from 5 to 8 mils. In threaded joints of the prior art the coatings have been reduced to 1½ to 2 mils in an attempt to allow normal threaded engagement.

Sealing in the joint 10 between the seal rings 20 and 22 and the male members 12 and 14 is provided on the innermost tapered surface of the seal rings and the end taper of the male members. As shown in the drawings the inner surfaces of the seal rings are shaped to define oppositely inclined conical faces tapered inwardly towards each end of the ring so that the inside diameters at each end of the ring are smaller than the inside diameter in the middle of the ring. This taper is made to be the same angle as the end taper on the male members. This angle A as shown in the drawings is 25°. When the two members are threaded together, the threads of the male member engage the first portion of the seal ring and the end taper of the male member seals against the matching internal taper of the seal ring. When these two tapered surfaces meet in sealing engagement no further tightening of the joint should be attempted. To provide a visual indication of the sealed position of the male member 12 in the female member 16 a mark 28 is provided by steel stamping, paint stenciling or other suitable means on the male member to indicate the depth to which the male member should be threaded into the coupling 16 with respect to the coupling face 29 to provide the desired seal.

The improved joint of the present invention may be used on a pin and box type of joint shown in FIG. 2. The male member has external threads and an end taper 32. The female member 34 has internal threads which are interrupted by the groove 36 in which the seal ring 38 is positioned. The seal ring 38 has an internal tapered surface 40 which mates in sealing engagement with the end taper 32 of male member 30 when the joint is completed. The female member 34 has an internal shoulder 42 against which the end of the male member 30 abuts when the two members are made-up to a completed joint. Also, the male member 30 has an external shoulder 44 against which end of the female member 34 abuts when the joint is completed.

The seal ring 46 shown in FIG. 3 illustrates the cross-sectional configuration of the preferred seal ring of the present invention. The seal ring 46 has an outer cylindrical surface 48, two end surfaces 50 and 52 extending radially inward and the internal tapering surfaces 54 and 56. The angle A of the tapers of surfaces 54 and 56 is the same as the angle of the end taper of the male member to be sealed. The seal ring 46 is symetrical about its midportion so that it may be installed either direction and still provide the mating tapered surface for sealing engagement with the male member.

In the form of the invention illustrated in FIGS. 4 and 5, the joint 60 is substantially the same as previously described and includes the male member 62 being externally threaded with the thread 64 terminating in the tapered sealing surface 66, the internally threaded female pipe member 68 whose threads 70 are interrupted by the groove 72 and the seal ring 74. In the form of the invention shown in FIG. 5, the interior of members 62 and 68 have a coating 76 and 78 respectively. The coating 76 on male member 62 extends over the end of the member and covers the sealing surface 66. The coating 78 in female member 68 terminates approximately midway of the bottom of the groove 72. The bottom surface 80 of groove is tapered slightly in a direction of increasing diameter away from the nearest end of female member 68. The angle "B" of taper of the surface 80 shown in FIG. 5 is preferred to be approximately 1 degree but may be as large as 5 degrees.

As shown in FIG. 5, the seal ring 74 is substantially the same as seal ring 46 illustrated in FIG. 3 having the two internal tapering surfaces 82 and 84 but such surfaces terminate in the flat surfaces 86 and 88 which eliminate the acute angle lip on seal ring 46.

The addition of the taper to the grooves provides several important advantages. By having the increased diameter, the tapered groove provides a larger volume into which the seal ring 74 may extrude without extruding into the flow passage through the joint. The greater depth of the groove at its inner end provides a greater shoulder against which the seal ring can react in sealing. Further, the additional depth is provided in which the plastic coating is received.

It should be noted that in all forms of the invention wherein internal coating is used the coating material terminates approximately midway through the internal seal ring grooves. This allows a portion of the bottom surface of the groove to be in contact with the seal ring which during make-up of the joint, permits the seal ring to be forced into the surface imperfections of the exposed groove bottom. This engagement increases the retention forces on the seal ring as compared to such forces when the entire groove is covered with the coating since the coating would be very smooth and would allow the ring to slide freely in the groove and possibly extrude out of the groove during make-up.

From the foregoing it can be seen that the improved sealed joint of the present invention seals against leakage without excess tightening of the joint members to thereby allow the same seal to be used even after multiple connections and disconnections of the joint. Further, this improved joint is suitable for use with coated pipe to allow full coating thickness to be applied to the exposed portions of the threads within the joint without interfering with the joint make-up or sealing.

What is claimed is:

1. A sealed joint between at least two tubular members, comprising a female tubular member having female threads therein, a male tubular member having male threads thereon, said male member terminating in a tapered end surface, an internal groove around the interior of said female member interrupting said female threads, and a preformed sealing ring positioned within said groove and sealingly engaging the inner end of said male member when said members are threaded together in assembled relation, the internal surface of said sealing ring in relaxed condition being of chevron-shaped radial cross-section to define oppositely inclined conical faces tapered inwardly toward each end of the ring so that the inside diameters at each end are smaller than the inside diameter in the middle of the ring, the conical faces of said sealing ring having an internal taper substantially matching the external end taper of said male member, said sealing ring in relaxed condition and when initially positioned within said groove being axially symmetrical and extending inwardly at least at each end a distance greater than said female threads whereby when it is engaged by said male member said ring is deformed by compression between said male and female members, said groove providing expansion space for said ring when compressed, one of said internal conical faces of said sealing ring being adapted to deform in and seal against the threads of said male member and the tapered end surface of said male member extending through said sealing ring into matching surface sealing engagement with the other of said internal conical faces of said sealing ring.

2. A sealed joint according to claim 1, including an internal coating on each of said male and female members, said internal coating within said male member extending over the end of said male member and onto the first few threads on the exterior of said male member, said internal coating within said female member covering the internal threads and a portion of said internal groove, leaving a portion of the bottom of said groove and the outermost threads of said female member free of coating.

3. A sealed joint according to claim 1 including a mark in the exterior of said male member defining the limit of make-up of said male member into said female member.

4. A sealed joint according to claim 1 wherein, said internal groove has a tapered bottom surface providing said groove with an increasing diameter in a direction away from the open end of said female member.

5. A sealed joint according to claim 4 wherein the taper of the bottom surface of said internal groove is approximately 1 degree.

6. A sealed joint according to claim 4 wherein the taper of the bottom surface of said internal groove provides said expansion space to be of sufficient additional volume into which said seal ring may extrude to prevent extrusion of the seal ring into the flow passage through said members.

\* \* \* \* \*